K. S. STENBO.
VERTICAL COFFEE MILL.
APPLICATION FILED SEPT. 27, 1919.
1,336,793.
Patented Apr. 13, 1920.
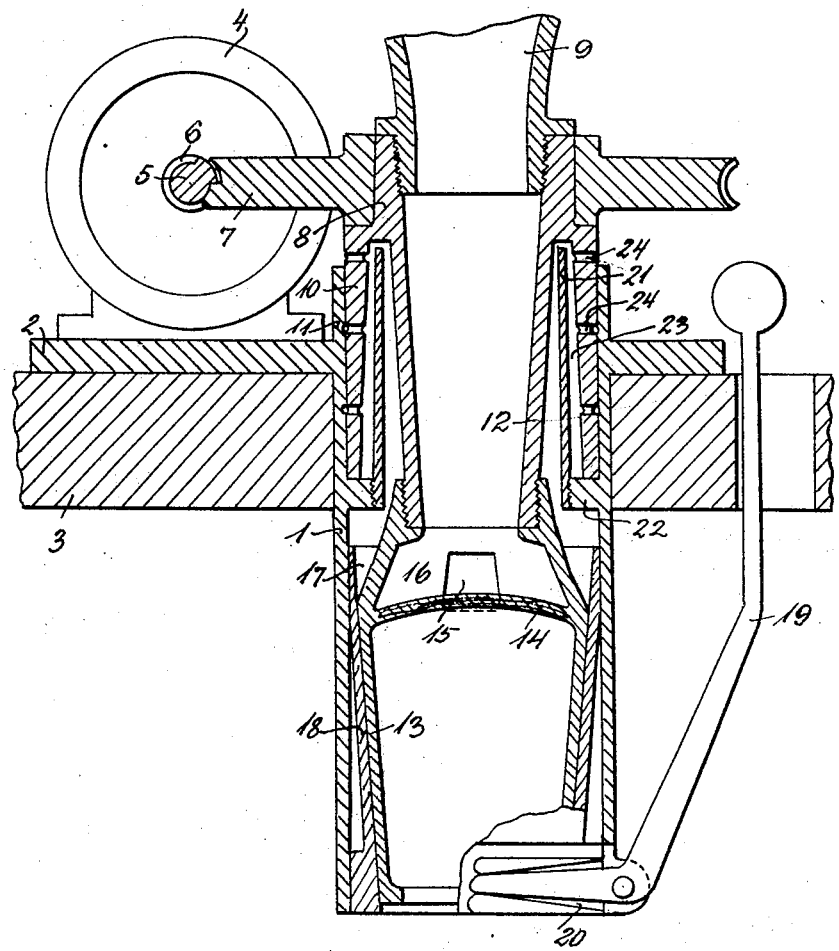
INVENTOR:
Kristen Severin Stenbo
By Wm Wallace White
ATTY.

UNITED STATES PATENT OFFICE.

KRISTEN SEVERIN STENBO, OF COPENHAGEN, DENMARK.

VERTICAL COFFEE-MILL.

1,336,793. Specification of Letters Patent. Patented Apr. 13, 1920.

Application filed September 27, 1919. Serial No. 326,846.

*To all whom it may concern:*

Be it known that I, KRISTEN SEVERIN STENBO, a subject of the King of Denmark, residing at Copenhagen, in the Kingdom of Denmark, have invented new and useful Improvements in Vertical Coffee-Mills, of which the following is a specification.

In the heretofore used steel coffee-mills with conical grinding surfaces, with exception of the small grinders for household-use, the axis of the grinding surfaces is horizontally disposed, because this arrangement is most convenient on account of the feed-hopper and the flywheel necessary in case of larger mills, when these are to be driven by hand-power.

In engine-driven mills, the provision of flywheels is not necessary, however, but they are retained nevertheless, mainly for advertising purposes in the so-called show-case coffee-grinders of the kind by which one or more mills are displayed, on a stand in the show-window of the store, their nickel-plated flywheels, which are rotated together with the mill-axles, facing the street. This arrangement necessitates a considerable transmission, which is partly placed within the show-case.

In order to attain a finer or coarser comminution of the coffee in the heretofore used steel coffee-mills with conical grinding faces, the mill-axle and the inner grinding member fixed thereon have been arranged to be movable lengthwise, and adjustments of the fineness of the grinding operation have been attained by pushing the inner grinding member farther into or withdrawing it somewhat from the corresponding outer coniform grinding-member. When coffee is present between the grinding surfaces, the adjustment of the inner grinding-member farther into the outer one can only be effected while the axle is rotated.

In coffee-mills with horizontal grinding-members, the lubricating oil may force its way into the coffee and moisten and pollute the same, especially when the oil-cups are well filled up.

The present invention has for its object to provide a steel coffee-mill with conical grinding-surfaces, of a construction by which the desirable advertising effect may be retained, namely by rotation of the feed-hopper, and whereby the provision of flywheels for advertising purposes and of the transmissions not required for the operation of the mill may be avoided. By the omission of the heavy flywheels and the transmissions, any unnecessary wear on axles and bearings will also be avoided, and the driving-power will be reduced.

The coffee is fed to the mill by way of the vertical hollow mill-axle and is caught by an intermediate bottom above which there are provided holes giving the coffee access to the space between the two grinding members.

In order to retain the advertising effect in such mills, the hollow mill-shaft supports, at its upper end, the feed-hopper, so that the hopper is rotated together with the shaft.

The lubrication of the mill-shaft and of its bearing is effected from an oil-chamber provided in the interior of the bearing, the level of the inner wall of the said chamber being adjusted in such a manner, relatively to the outer wall of the bearing, that the oil cannot flow over the said wall and down to the grinding-surfaces.

One manner of constructing the invention is illustrated on the drawing, which shows a vertical section of a vertical motor-driven grinding-mill.

1 is the mill-casing fitted with a plate 2, which is fastened to the top plate 3 of the stand and supports the motor 4. The shaft 5 of the latter is fitted with a worm 6 engaging a worm-wheel 7 on the mill-shaft 8 into the top end whereof the feed-hopper 9 is screwed. The mill-shaft 8 is fitted with an outer cylinder 10 fitting into the bearing 11 of the mill-casing, and an interior tube 12 to the bottom end whereof the inner grinding member 13 is fastened. This grinding-member is hollow and the upper portion thereof forms a chamber 16 limited at bottom by a convex partition 14, there being provided, in the wall of the chamber, discharge holes 15 (only one of which is shown on the drawing) for the coffee which slides from the hopper 9 by way of the tube 12 down into the chamber 16 and thence, through the holes 15, out into the funnel-shaped space 17 between the top parts of the grinding members.

18 is the outer grinding member which is inserted in the mill-casing 1, and is held in position there by a suitable pinching or tightening device. The grinding member 18 is adjustable up and down in the mill-casing by means of a bell-crank lever 19, which is pivoted to the mill-casing and whose lower, preferably forked-shaped, arm engages a groove or recess 20 on the outside of the grinding member 18.

21 is a tube provided between the inner tube 12 of the shaft 8 and the outer cylinder 10 and firmly screwed to a flange 22 on the inside of the mill-casing 1, against which flange the lower edge of the cylinder 10 bears, so that there is formed, between the tube 21 and the cylinder 10, a space 23 serving as an oil-chamber. From this chamber, the oil passes, by way of bores 24, out to the wearing surfaces on the cylinder 10 and the bearing 11. The uppermost bore 24 is located immediately above the top edge of the bearing 11, so that the oil, in case the chamber 23 is filled to overflowing, will flow over the top edge of the bearing, the top edge of the tube 21 being at a higher level than that of the bearing. Any excessive supply of oil is thereby prevented from flowing down to the grinding surfaces.

Instead of the feed-hopper being placed in the upper end of the mill-shaft, it may be placed on a suitable frame on the plate 2, so that it will be independent of the shaft and will not be rotated together with the latter.

Having now particularly described and ascertained the nature of my said invention and in what manner the same is to be performed, I declare that what I claim is:—

1. A grinding mill, comprising a cylindrical casing provided with an oil chamber concentric therewith, a double-walled hollow shaft having its outer wall supported for rotation within said chamber, a grinding member secured to the inner wall of said shaft and adapted to rotate therewith, and a coöperating grinding member secured within said casing.

2. A grinding mill, comprising a cylindrical casing provided with an oil chamber concentric therewith, a double-walled hollow shaft having its outer wall supported for rotation within said chamber, a grinding member secured to the inner wall of said shaft and adapted to rotate therewith, said grinding member having a chamber in its upper end in communication with said hollow shaft, and a coöperating grinding member secured within said casing.

3. A grinding mill, comprising a cylindrical casing provided with an oil chamber concentric therewith, a double-walled hollow shaft having its outer wall supported for rotation within said chamber, a grinding member secured to the inner wall of said shaft, and having a chamber in its upper end in communication with said shaft, and a coöperating grinding member secured within said casing, the wall of the chamber in said first grinding member being provided with openings in communication with said coöperating grinding member, and the bottom of said chamber being so formed as to direct material to be ground toward said openings.

4. Steel coffee-mill comprising grinding members and a hollow vertical shaft, the hollow shaft being firmly connected at the bottom to one of the grinding members which contains, at its upper end, a chamber closed by an intermediate bottom adapted to catch the coffee dropping down and to direct it sidewise toward the walls of the chamber, wherein there are provided holes located immediately above the intermediate bottom and adapted to afford passage for the coffee to the grinding surfaces, the hollow shaft supporting a cylinder being concentric with the axis of the shaft and resting in a bearing in a mill-casing, there being provided between the said cylinder and the wall of the hollow shaft a space, wherein there is inserted a tube adapted to form, in combination with the said cylinder, an oil-chamber, the wall of the said cylinder being perforated somewhat below the top edge of the said tube.

5. A grinding mill, comprising a cylindrical casing provided with an oil chamber concentric therewith, a hollow shaft, a cylinder supported by said shaft concentric with the axis thereof for rotation within said chamber, a grinding member secured to the shaft and adapted to rotate therewith, and a coöperating grinding member secured within said casing.

6. A grinding mill, comprising a cylindrical casing provided with an oil chamber concentric therewith, a hollow shaft, a cylinder supported by said shaft concentric with the axis thereof for rotation within said chamber, a grinding member secured to the shaft and adapted to rotate therewith, said grinding member having a chamber in communication with the interior of the shaft, and a coöperating grinding member secured within said casing.

7. A grinding mill, comprising a cylindrical casing provided with an oil chamber concentric therewith, a hollow shaft, a cylinder supported by said shaft concentric with the axis thereof for rotation within said chamber, a grinding member secured to the shaft and having a chamber in communication with the interior of the shaft, and a coöperating grinding member secured within said casing, the side wall of the chamber in said first grinding member being provided with openings adapted to afford passage for the material to be ground to the grinding surfaces.

8. A steel coffee mill, comprising, in combination, grinding members and a hollow vertical shaft, the latter supporting at its upper end a feed hopper adapted to be rotated with the shaft, the hollow shaft having one of the grinding members secured at its lower end, said grinding member being provided with a chamber closed by a bottom, the side wall of which chamber is provided with holes adapted to afford passage for the coffee to the grinding surfaces, the hollow shaft supporting a cylinder concentric with the axis of the shaft and spaced from the shaft, a mill casing provided with a bearing for said cylinder, a tube supported in the space between the shaft and cylinder and adapted to form in combination with said cylinder an oil chamber, the wall of the said cylinder being perforated below the top edge of said tube, the top edge of the mill casing being below the top edge of said tube.

In testimony whereof I have signed my name to this specification.

KRISTEN SEVERIN STENBO.

Witnesses:
E. WEIESCOW,
V. BELMER.